US010600327B2

(12) United States Patent
Evan

(10) Patent No.: US 10,600,327 B2
(45) Date of Patent: Mar. 24, 2020

(54) UNMANNED AIRCRAFT TRANSPORTATION

(71) Applicant: FUJITSU LIMITED, Kawasaki-shi, Kanagawa (JP)

(72) Inventor: Glen Evan, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 167 days.

(21) Appl. No.: 15/671,122

(22) Filed: Aug. 7, 2017

(65) Prior Publication Data
US 2019/0043371 A1 Feb. 7, 2019

(51) Int. Cl.
*G08G 5/00* (2006.01)
*G05D 1/00* (2006.01)
*G06Q 10/08* (2012.01)
*G01S 5/00* (2006.01)
*G08G 5/02* (2006.01)
*B64F 1/12* (2006.01)
*H04W 4/02* (2018.01)
*G05D 1/10* (2006.01)
*B64C 39/02* (2006.01)
*H04W 4/40* (2018.01)

(52) U.S. Cl.
CPC ......... *G08G 5/0069* (2013.01); *B64C 39/024* (2013.01); *B64F 1/12* (2013.01); *G01S 5/0009* (2013.01); *G05D 1/0088* (2013.01); *G05D 1/102* (2013.01); *G06Q 10/083* (2013.01); *G08G 5/0034* (2013.01); *G08G 5/025* (2013.01); *H04W 4/02* (2013.01); *H04W 4/40* (2018.02)

(58) Field of Classification Search
CPC .... G08G 5/0069; G08G 5/025; G06Q 10/083; B64F 1/12; G01S 5/0009; G05D 1/0088
See application file for complete search history.

(56) References Cited

U.S. PATENT DOCUMENTS

| 4,676,413 A | 6/1987 | Began et al. |
| 9,387,928 B1 | 7/2016 | Gentry et al. |
| 9,457,915 B2 | 10/2016 | Wang |
| 9,481,475 B2 | 11/2016 | Campillo et al. |
| 9,545,852 B2 | 1/2017 | Streett |
| 2009/0227423 A1 * | 9/2009 | Bentner ................. B60T 7/107 477/197 |
| 2009/0314883 A1 | 12/2009 | Arlton et al. |
| 2012/0176491 A1 | 7/2012 | Garin et al. |
| 2015/0120094 A1 | 4/2015 | Kimchi et al. |
| 2015/0151433 A1 | 6/2015 | Rust et al. |

(Continued)

FOREIGN PATENT DOCUMENTS

JP 2016-535879 A 11/2016

*Primary Examiner* — Yuen Wong
(74) *Attorney, Agent, or Firm* — Maschoff Brennan

(57) ABSTRACT

A method of transporting an unmanned aircraft (UA) is provided. The method may include determining a route for transporting an unmanned aircraft (UA). Further, the method may include determining at least one vehicle for transporting the UA along the determined route. The method may also include deploying the UA to a first waypoint of the determined route. Moreover, the method may include docking the UA to a first docking station mounted to a first vehicle of the at least one vehicle proximate the first waypoint. In addition, the method may include transporting the UA to a second waypoint of the determined route via the first vehicle, and undocking the UA from the first docking station at the second waypoint.

20 Claims, 15 Drawing Sheets

(56) References Cited

U.S. PATENT DOCUMENTS

| | | |
|---|---|---|
| 2015/0353206 A1 | 12/2015 | Wang |
| 2015/0370251 A1 | 12/2015 | Siegel et al. |
| 2016/0068277 A1 | 3/2016 | Manitta |
| 2016/0196756 A1* | 7/2016 | Prakash ................ B64C 39/024 701/3 |
| 2016/0257401 A1 | 9/2016 | Buchmueller et al. |
| 2016/0364679 A1 | 12/2016 | Cao |
| 2017/0344000 A1* | 11/2017 | Krishnamoorthy ... B64C 39/024 |

* cited by examiner

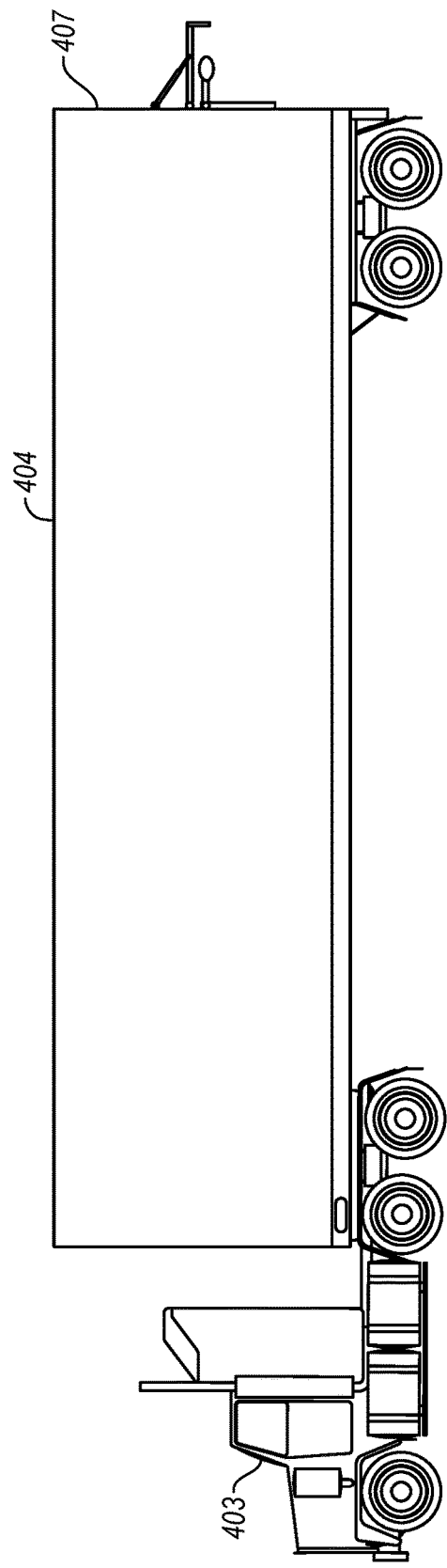
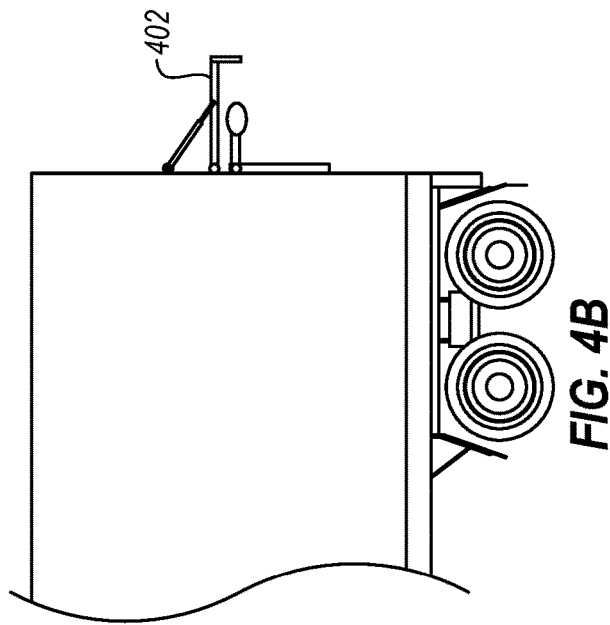
FIG. 4A
FIG. 4B

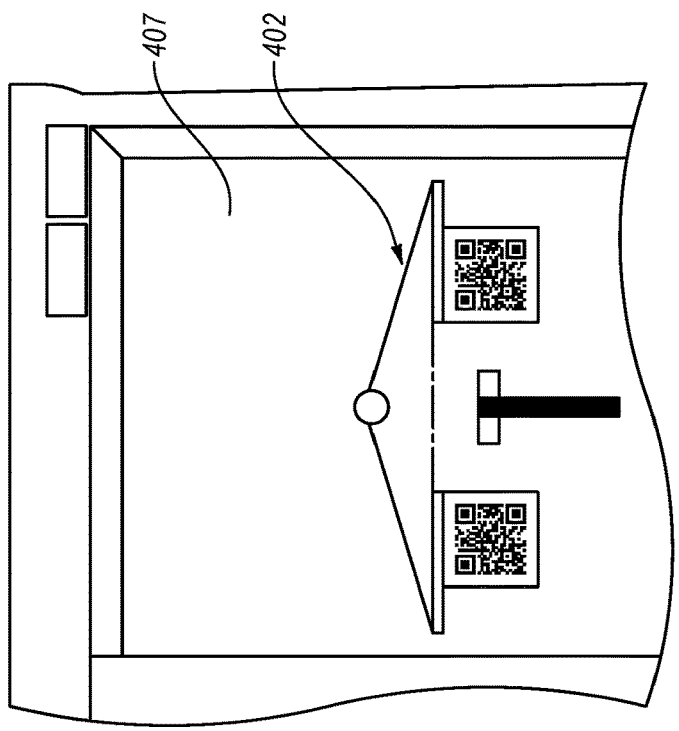
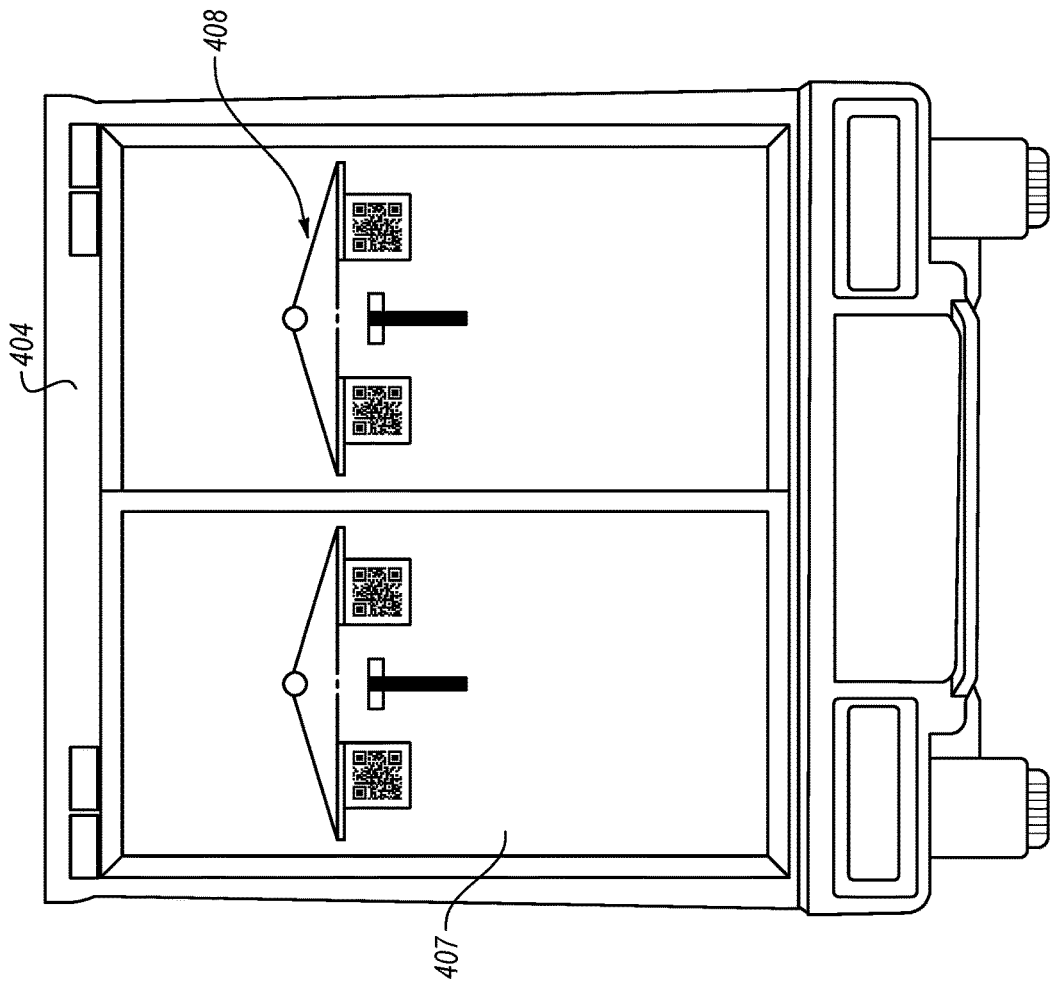
FIG. 4D
FIG. 4C

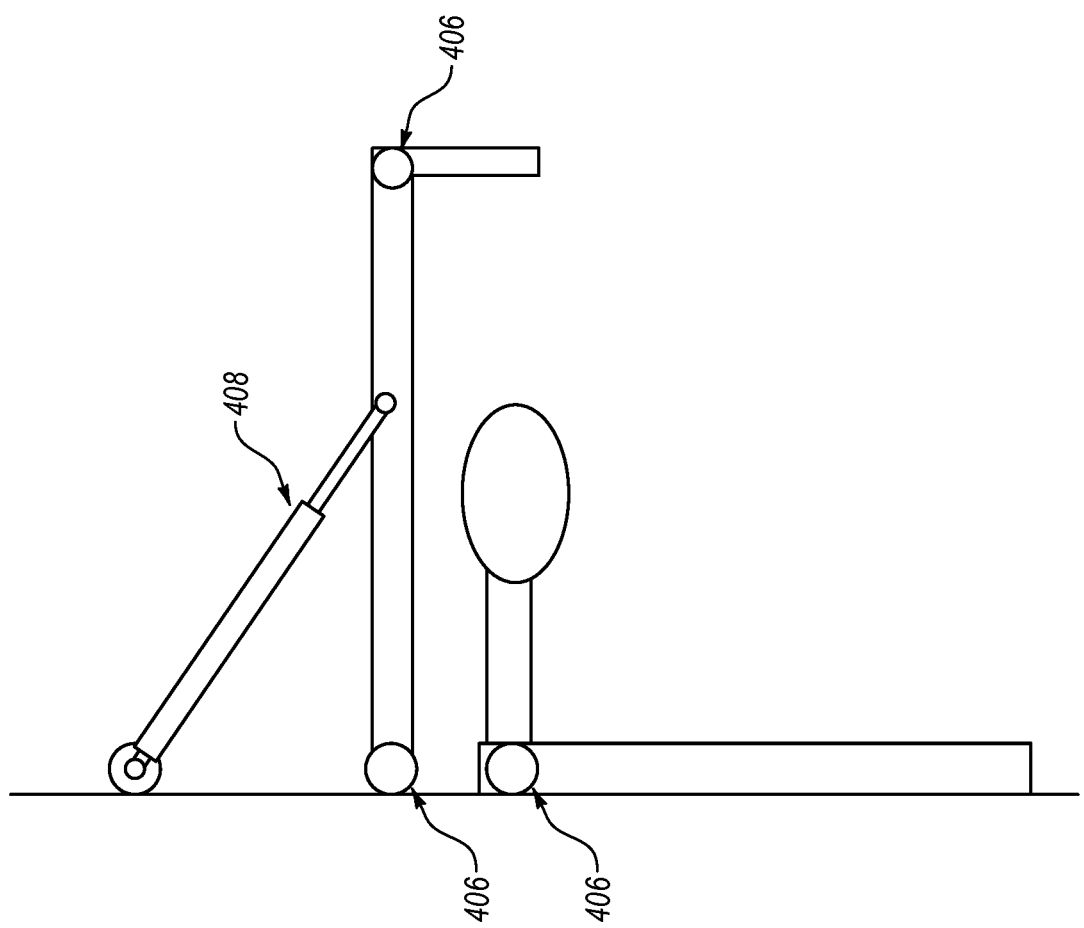

UNMANNED AIRCRAFT TRANSPORTATION

FIELD

The embodiments discussed herein relate to transportation of unmanned aircraft.

BACKGROUND

An unmanned aircraft (UA), which may also be referred to as an unmanned aerial vehicle (UAV), a remotely piloted aircraft system (RPAS), a remotely piloted vehicle (RPV), a drone, and the like, is an aircraft without an on-board human pilot. UAs are used in many applications such as delivery, surveillance, filmmaking, law enforcement, rescue, agriculture, and logistics.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include determining a route for transporting an unmanned aircraft (UA). Further, the method may include determining at least one vehicle for transporting the UA along the determined route. The method may also include deploying the UA to a first waypoint, Moreover, the method may include docking the UA with a first docking station mounted to a first vehicle of the at least one vehicle proximate the first waypoint. In addition, the method may include transporting the UA to a second waypoint via the first vehicle and undocking the UA from the first docking station at the second waypoint.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 4A-4E illustrate an example collapsible docking station;

DESCRIPTION OF EMBODIMENTS

Figure 1A:
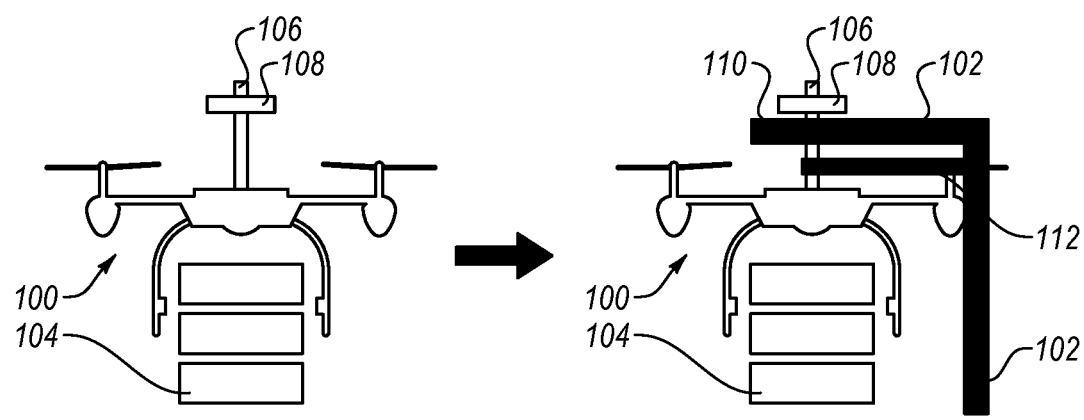
FIG. 1A depicts an example unmanned aircraft and an example docking station.

Various embodiments discussed herein relate to unmanned aircraft (UA) transportation. According to various embodiments, a UA, (e.g., a drone), after leaving its source of departure (e.g., a warehouse), may transmit a request for delivery (e.g., of the drone and possibly one or more packages) to a destination, or proximate thereto. According to various embodiments, an UA may be transported via one or more vehicles (e.g., car, truck, bus, boat, etc.), wherein each vehicle includes a UA docking station mounted thereon.

The use of commercial UAs (e.g., drones) is becoming increasingly popular, and commercial UA used in urban and rural areas face many obstacles to operation. These are primarily in the areas of safety and support.

Safety issues with UAs may relate to their operation around people and their potential interference with vehicles on the ground and in the air. For example, a UA may land on a person injuring or even killing them, collide with a vehicle causing a crash, or collide with a low flying air vehicle, such as a medical or traffic helicopter. Also, a UA may be pulled into a passenger jet engine causing engine failure.

Another safety concern is that UAs may have issues with weather. Options for UA use in heavy weather are limited, and UAs that rely on stationary infrastructure may be out of range or unable to move to safety under the severe conditions. Strong wind may force a UA into a no-fly zone, which is undesirable and is potentially dangerous.

To address these concerns, government and industry are working on systems patterned on the air traffic control systems. These systems may include coordinated routes along designated corridors with no-fly zones around, for example, airports and hospitals. Also, areas (e.g., cities) are outlawing UA traffic within the city limits. Compared to conventional systems and methods, embodiments of the present disclosure address UA safety concerns in a much less restrictive way.

Various embodiments disclosed herein may reduce an amount of time a UA is in the air and thus the danger of collisions with people and/or vehicles may be reduced. The UA can make any necessary transfers from one vehicle to another as long as each vehicle is equipped with a docking station and the operator or owner of the vehicle agrees to transport the UA. Upon arriving at the destination, or proximate thereto, the UA may undock from a vehicle's docking station and accomplish its task (e.g., package delivery or surveillance/inspection). The UA may return (e.g., in a similar manner) or remain charging on a stationary or mobile platform.

In some embodiments, a shared economic model may allow for UAs (e.g., UAS/drones configured for various activities including package delivery and surveillance) to be transported (e.g., through no-fly zones) within range of their destinations. Various embodiments may include on-demand delivery systems, wherein a control unit and/or an UA or its operator may identify one or more vehicles that are traveling on routes that may deliver the UA to its destination or nearby. According to various embodiments, one or more vehicles traveling on a route may contribute to transportation of a UA. Further, upon arrival at a destination, an automated financial transaction for on-demand services may be enacted.

In some embodiments, a docking station may be coupled to a vehicle. The docking stocking may be configured such that a UA may land thereon. In some embodiments, the docking station may be configured to provide shelter to the UA (e.g., to protect the UA from damage). The docking station may further be configured to support payload storage for a UA.

According to some embodiments, as described more fully herein, a docking station may include a hanging UA anchoring system. Moreover, various embodiments may include a system of pairing that identifies the docking station to the UA through marker or transmission. In these and other embodiments, a vehicle's intended route and destination information may be communicated to an UA and/or an UA operator for use in route planning. A vehicle operator may opt in to take the UA for all or part of the route to the destination of the UA. The vehicle operator and/or owner of the provided transportation may be compensated for the service of transporting the UA.

A UA's limited range due to limited battery life is another concern of UA usage. According to some embodiments of the present disclosure, docking stations may be configured for charging one or more UAs positioned thereon (e.g., while being transported). Thus, various embodiments may reduce infrastructure costs and may increase the range of UAs.

Embodiments of the present disclosure will be explained with reference to the accompanying drawings.

Figure 1B:
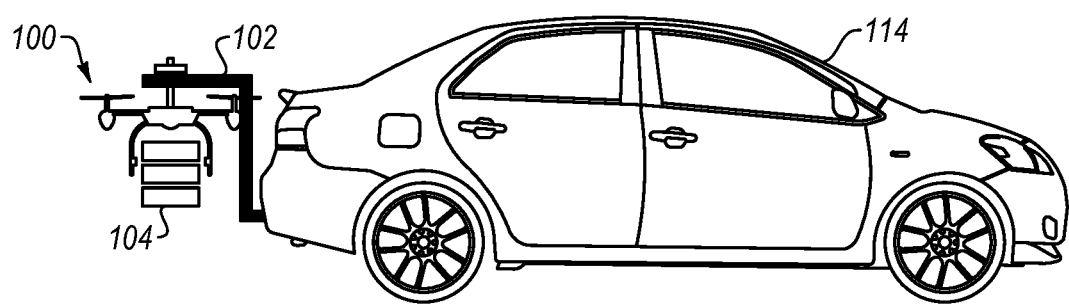
FIG. 1B illustrates an example docking station mounted to a vehicle.

FIG. 1A depicts a UA 100 and a docking station 102, arranged in accordance with at least one embodiment disclosed herein. As depicted, UA 100, which is carrying one or more packages 104, may be configured to dock on docking station 102. UA 100 includes a pole 106 and a docking disk 108. Docking station 102, which may also be referred to herein as a "docking platform" or simply "platform" includes a docking plate 110 and a clamp 112. As illustrated in FIG. 1A, docking station 102 may be configured such that a UA (e.g., UA 100) may hang from a docking plate 110 of docking station 102. FIG. 1B depicts docking station 102, with UA 100 couple thereto, mounted to a vehicle 114.

Figure 2A:
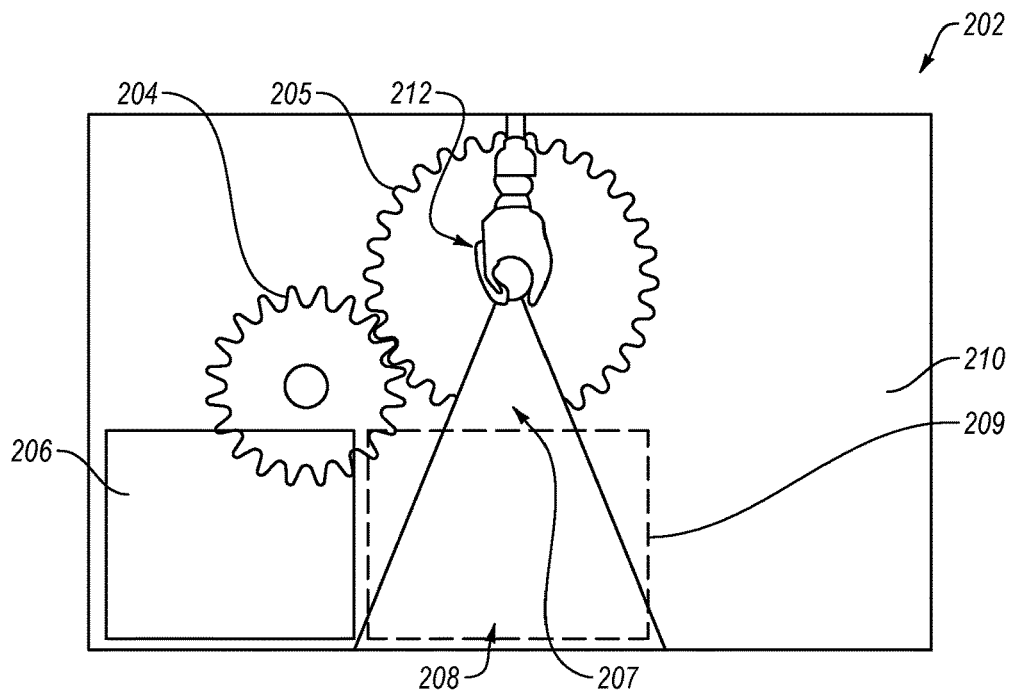
FIGS. 2A-2C illustrate an example docking station.
Figure 2B:
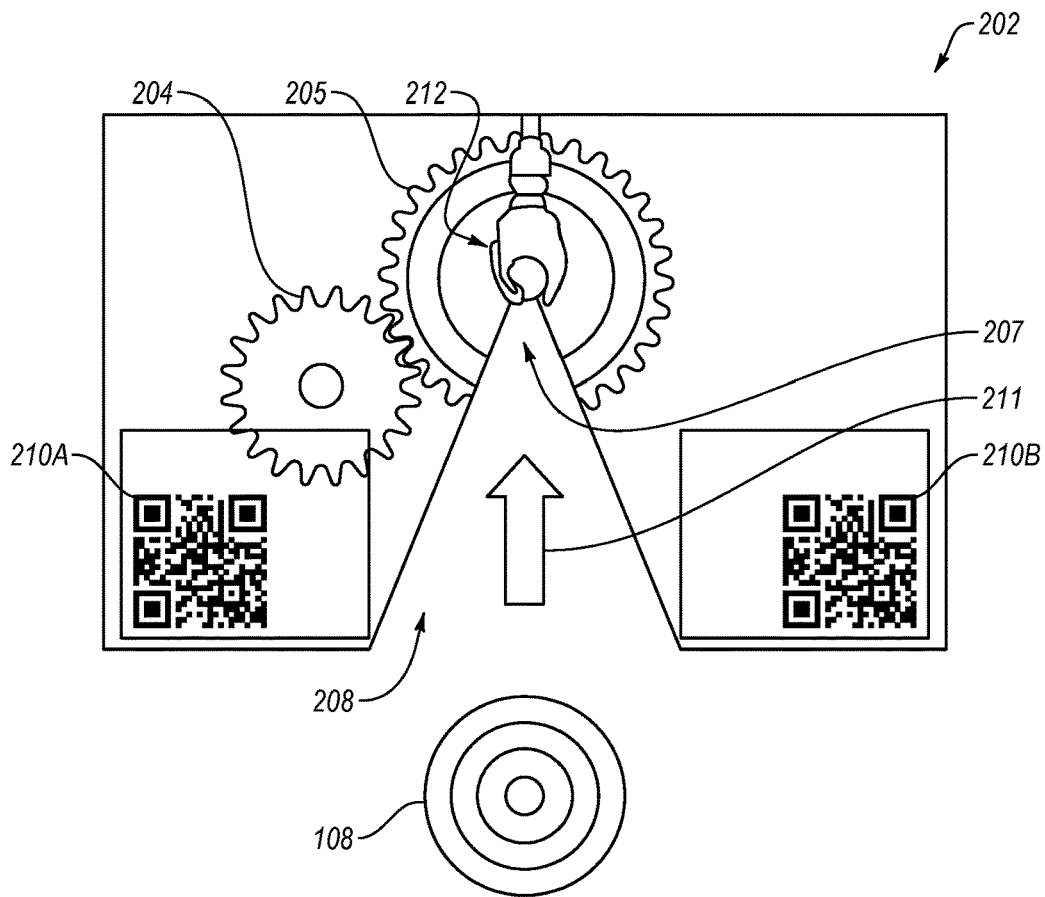

FIG. 2A is a top-view of a portion of an example docking station 202. Docking station 202 may include docking station 102 illustrated in FIGS. 1A and 1B. As depicted in FIG. 2A, docking station 202 includes gears 204 and 205, a cover 206, a docking slot (also referred to herein as a "docking keyhole" or "keyhole") 208, a docking plate 210, a clamp 212, and visual cues (not shown in FIG. 2A; see FIG. 2B). Gear 205 includes a cut-out portion 207. In some embodiments, gear 205 may be driven by gear 204. In addition, according to some embodiments, gear 204 may drive cover 206 to slide between open position (as shown by reference numeral 206) and closed position (e.g., as shown by reference numeral 209). FIG. 2B is another top-view illustration of example docking station 202. As depicted in FIG. 2B, docking station 202 includes visual cues 210A and 210B (also referred to herein as "tags"). Also shown in FIG. 2B, docking disk 108 of a UA (e.g., UA 100) may, during a docking process, move in a direction as illustrated by arrow 211 to a secured position, such as within a cradle of docking plate 210.

Figure 2C:
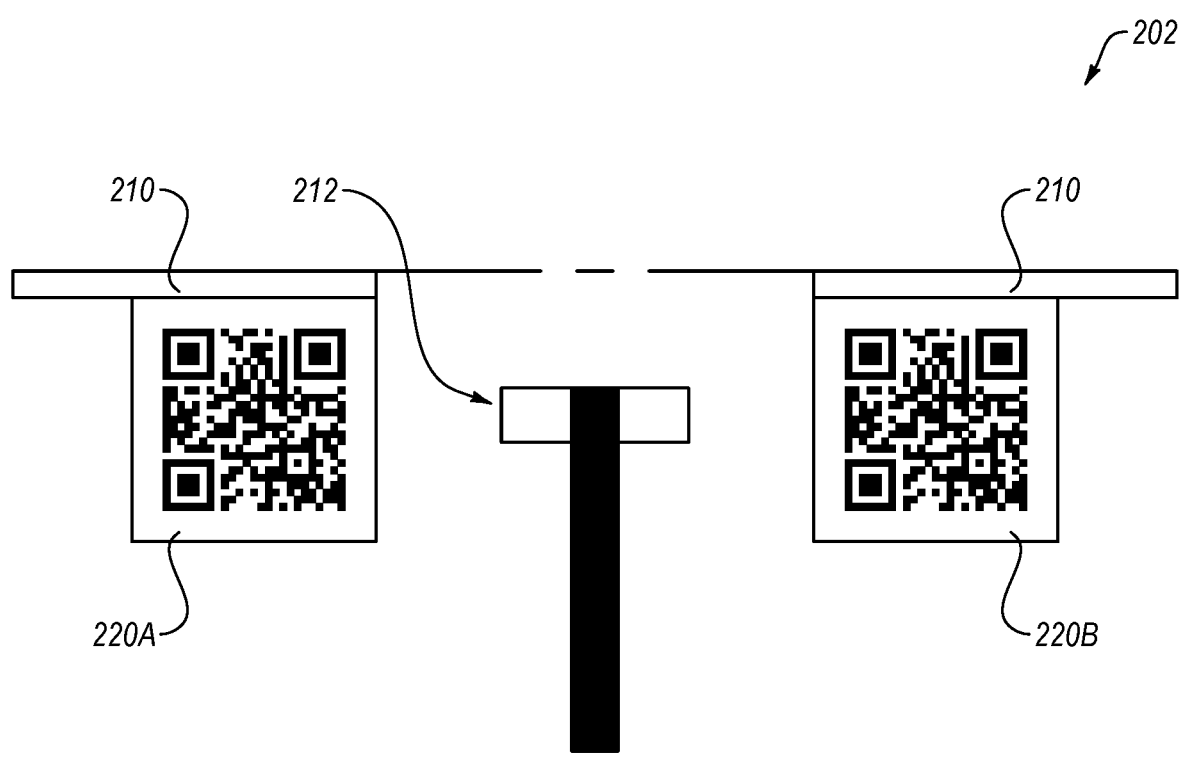

FIG. 2C is a side-view illustration of a portion of example docking station 202. As depicted in FIG. 2C, docking station 202 includes docking plate 210, clamp 212 and visual cues 212A and 212B (also referred to herein as "tags"). As shown in FIGS. 2B and 2C, docking station 202 may include visual cues that are visible from above docking station 202 (e.g., visual cues 210A and 210B), and visual cues that are visible from a side of docking station 202 (e.g., visual cues 220A and 220B).

According to various embodiments, a docking station may include one or more cameras that may be utilized to assist in a landing and/or docking process. For example, docking station 202 may include one or more cameras to facilitate visual landing and/or docking. More specifically, docking plate 210 may include the one or more cameras. Further, a UA may include one or more cameras to augment the landing and/or docking process.

Visual cues 210 and/or visual cues 220, which may include symbols and/or QR codes, may be used (e.g., at keyhole 208 entry) to enable for proper alignment and altitude of a UA for docking. In some embodiments, a suitably sized docking slot entry may enable a UA to easily navigate to the docking slot by flying (e.g., forward) and riding an edge of a docking station into the docking slot.

In addition, upon the UA being positioned within the docking slot 208, one or sensors of docking station 202 may detect the UA, and the UA, and possibly its payload, may be secured (e.g., via one or more mechanisms). For example, in some embodiments, gears 204 and 205 may be used for securing the UA. Gears 204 and 205, along with docking slot 208 and/or clamp 212, may secure the UA and its payload in place.

In some embodiments, cut-out portion 207 of gear 205 may substantially match (e.g., in shape and/or alignment) docking slot 208. In some embodiments, one or more sensors may trigger gear 204 to rotate gear 205, thus closing the gap in the keyhole entry and securing the UA in place.

Further, one or more cover plates (e.g., cover 206) may be configured to slide shut (e.g., at the same time as gear 205 rotates). Moreover, clamp 212, which may be positioned below gear 205, may close around pole 106 of UA 100, thus securing and stabilizing UA 100 in place. In some embodiments, clamp 212 may secure UA 100 from lateral movement. In some embodiments, clamp 212 may be triggered by docking disk 108 of UA 100 resting in a cradle of docking plate 210.

Figure 3A:
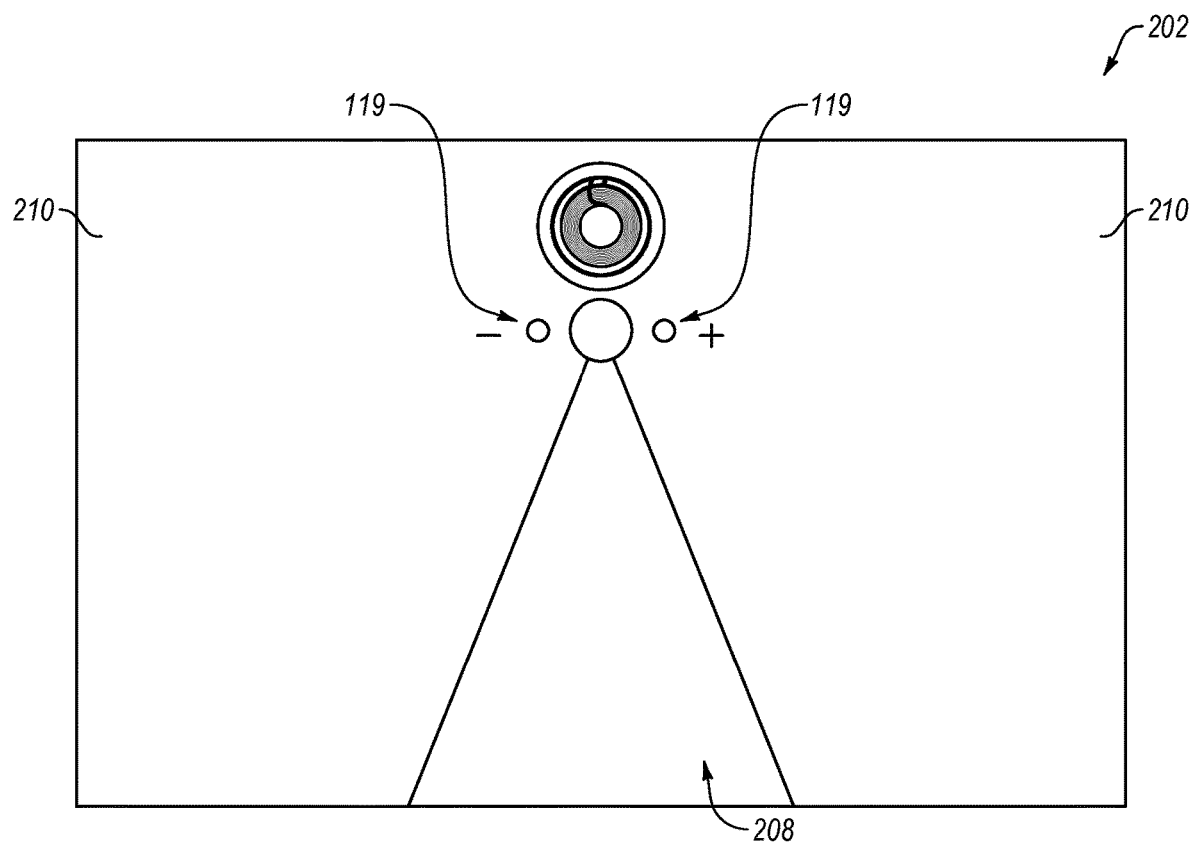
FIGS. 3A-3C depict an example docking station and an unmanned aircraft (UA) docking disk.
Figure 3B:
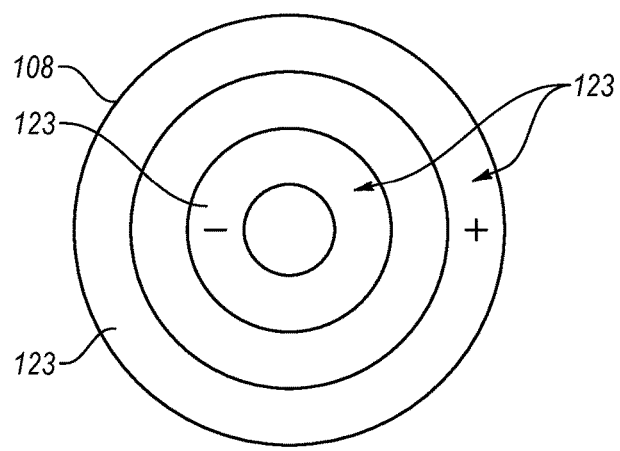
Figure 3C:
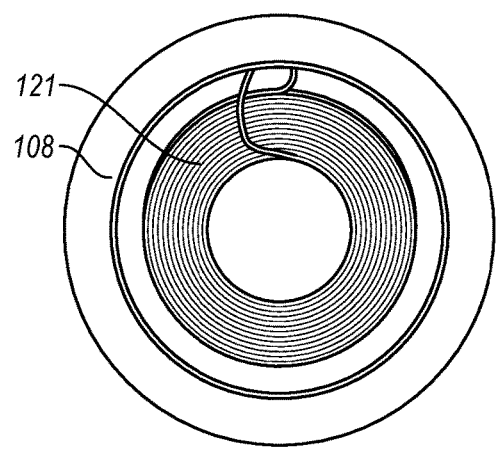

According to various embodiments, a UA and a docking station may be configured to enable a UA docked at docking station 202 to be charged via, for example, inductive and/or lead-based charging. FIGS. 3A-3C depict various view of docking disk 108 of UA 100 (see FIG. 1) and a portion of docking station 202 including docking slot 208, plate 210, and charging leads 119. In some embodiments, docking disk 108 may include one or more inductive coils 121, which may be aligned with one or more coils of docking station 112 and, more specifically of docking plate 210, to charge UA 100.

In some embodiments, docking disk 108 may be configured such that one or more rings 123 of docking disk 108 may include different polarities for charging. This configuration may ensure that 119 leads make sufficient contact despite a position (e.g., rotated position) of docking disk 108.

A docking process may be automatic, manual, or a combination thereof. In some embodiments, a securing process may be triggered upon a UA entering docking slot 208. Further, upon pole 106 (see FIG. 1) entering docking slot 208 and gear 205 rotating shut, docking disk 108 may be positioned (e.g., lowered into) a cradle of docking plate 210 making contact with charging leads and/or one or more sensors, which may detect a secured UA.

In some embodiments, upon a UA being signaled to depart, the UA may initiate its flying mechanism (e.g., one or more propellers), triggering the docking station to initiate an undocking mode. In response to initiation of an undocking mode, the UA, and more specifically, a clamp (e.g., claim 212), may release the UA. This may allow for vertical movement of the pole (e.g., pole 106) when the UA begins to ascend.

After departure (e.g., liftoff) and upon the UA being sufficiently position (e.g., at a sufficient vertical height to lift the disk out of the cradle for a predetermined amount of time), the gear mechanism (e.g., gears 204 and/or 205) may rotate and a cover (e.g., cover 206) may slide out of the way allowing the UA to depart from the docking station. The UA may depart from the vehicle while the vehicle is stationary or in motion.

A docking station may be retrofit to a vehicle or may be installed at a factory. Further, a docking station may permanently or temporary attached (e.g., via a door mount) to a vehicle.

Some embodiments may include a collapsible docking station. For example, as illustrated in FIGS. 4A-4E, a collapsible docking station 402 may be coupled to a trailer of semi-truck 404 (also referred to herein as a semi-truck trailer). FIGS. 4A-4E depict various illustration of a semi-truck 403, semi-truck trailer 404 and collapsible docking station 402. In these and other embodiments, collapsible docking station 402 may include one or more hinges 406 and/or one or more springs 408 including for example, gas spring rods that may allow a docking station, without a UA coupled thereto, to lay flat against a surface 407 (e.g., vehicle door, such as a rear door of semi-truck trailer).

In one example, a collapsible docking station, such as docking station 402, which, while positioned substantially flat against surface 407 of a semi-truck trailer 404, may facilitate the opening of the door flush to a side of trailer 404. Further, an extension to a door catch on the side of trailer 404 may facilitate securing the open rear door (e.g., surface 407) of trailer 404 when docking station 402 is in s collapsed position with the door open. Further, in some embodiments, docking station 402 may be mounted under a wind guard on a roof of a semi-truck. This may reduce wind drag and may protect the UA and its payload.

According to some embodiments, multiple docking stations may be retrofit to a vehicle (e.g., van, truck, trailer, carrier trailer or other open frame trailers) allowing for the transport of a fleet of UAs and their payloads. Further, a docking station may be mounted to a vehicle in any suitable manner. For example, a docking station may be mounted to a vehicle via the vehicle's hitch, trunk, hatch and/or bumper mountings.

As disclosed herein, a docking station may be configured to mount a UA behind a vehicle rather than above (e.g., on top) of the vehicle. This may reduce wind drag of the UA and reduce the exposure to weather. Further, a platform and/or protective cover plate of a docking station may reduce drag on the vehicle in relationship to a vehicle with a top mounted UA platform.

In addition to mounting a docking station to a mobile object (e.g., a vehicle), in some embodiments, a docking station may be mounted to stationary objects (e.g., buildings or infrastructure).

Figure 5A:
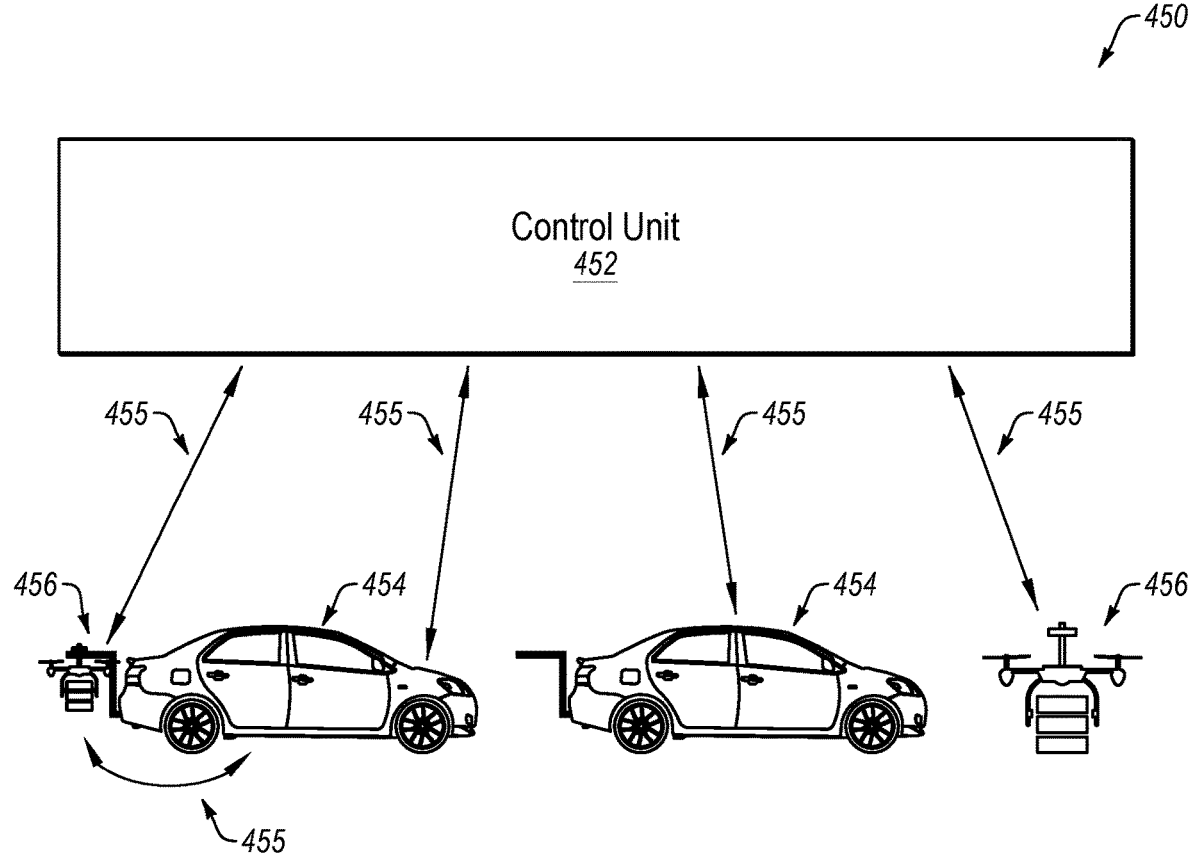
FIG. 5A depicts an example system including a control unit, a vehicle unit, and a UA unit.

FIG. 5A is a block diagram illustrating an example system 450 including a control unit 452, a vehicle unit 454, and a UA unit 456, each of which being configured for communication with one another via a network 455. In some embodiments, control unit 452 may include a control system (e.g. including one or more computing devices having memory, one or more processors, communication device, etc.) for monitoring and/or controlling a UA transportation system. Further, vehicle unit 454 may include, for example, a mobile device having an application program installed thereon. More specifically, for example, vehicle unit 454 may include a vehicle operator's mobile device including an application program. In other embodiments, vehicle unit 454 may part of a vehicle, such as part of a vehicle's navigation and/or entertainment system. UA unit 456 may be part of a UA and may include, for example, memory, one or more processors, a communication device, etc.

Figure 5B:
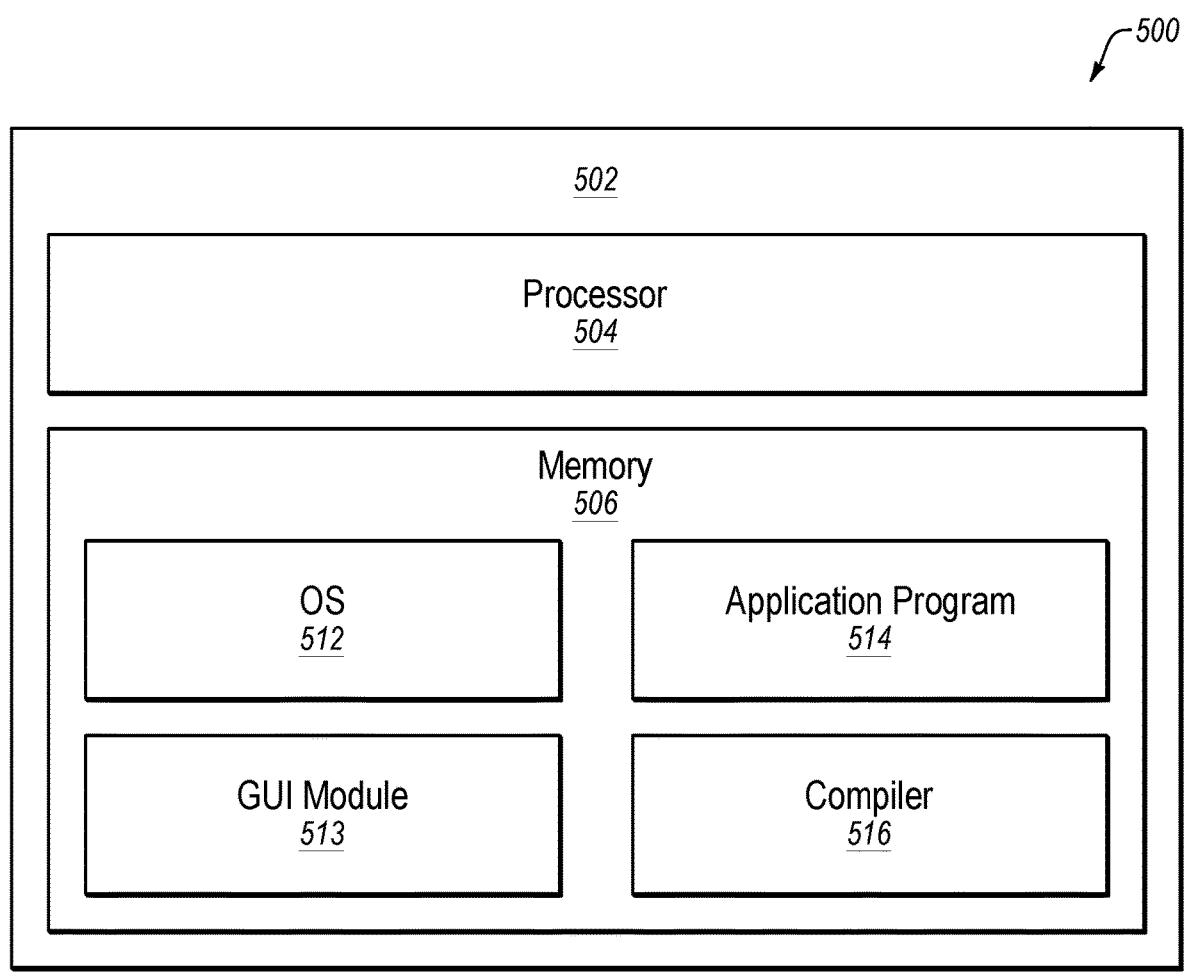
FIG. 5B is a block diagram of a UA transportation system.

FIG. 5B illustrates a system 500 that may be used to implement various embodiments of the present disclosure. System 500 may include a computing system 502 that comprises a processor 504 and memory 506. For example only, and not by way of limitation, computing system 502 may comprise a workstation, a laptop, or a hand held device such as a cell phone or a personal digital assistant (PDA), a server, or any other processor-based device known in the art. In one embodiment, computing system 502 may be operably coupled to one or more displays (not shown in FIG. 5B) configured to display data via a GUI to, for example, one or more users (e.g., a controller, an operator (e.g., a driver) of a vehicle, UA operator, etc.). For example, control unit 452, vehicle unit 454, and/or UA unit 456 (see FIG. 5A) may include at least a portion of computing system 502.

Generally, computing system 502 may operate under control of an operating system 512 stored in the memory 506, and interface with one or more users to accept inputs and commands and to present outputs through a GUI module 513. Although GUI module 513 is depicted as a separate module, the instructions performing the GUI functions may be resident or distributed in the operating system 512, an application program 514, or implemented with special purpose memory and processors. Computer 502 may also implement a compiler 516 that allows application program 514 written in a programming language to be translated into processor 504 readable code. After completion, application program 514 may access and manipulate data stored in the memory 506 of computing system 502 using the relationships and logic that are generated using the compiler 516.

Further, operating system 512 and application program 514 may include instructions that, when read and executed by the computer 502, may cause the computer 502 to perform the steps necessary to implement and/or use embodiments of the present disclosure. Application program 514 and/or operating instructions may also be tangibly embodied in memory 506 and/or data communications devices, thereby making a computer program product or article of manufacture according to one or more embodiments of the disclosure. As such, the term "application program" as used herein is intended to encompass a computer program accessible from any computer readable device or media. With reference to FIGS. 5A and 5B, application program 514 may exist on vehicle unit 454 (e.g., a vehicle, an electronic device (e.g., a vehicle operator's mobile device), UA unit 456, or control unit 452. Furthermore, portions of application program 514 may be distributed such that some of application program 514 may be included on a computer readable media within vehicle unit 454, UA unit 456, and/or control unit 452.

Figure 6:
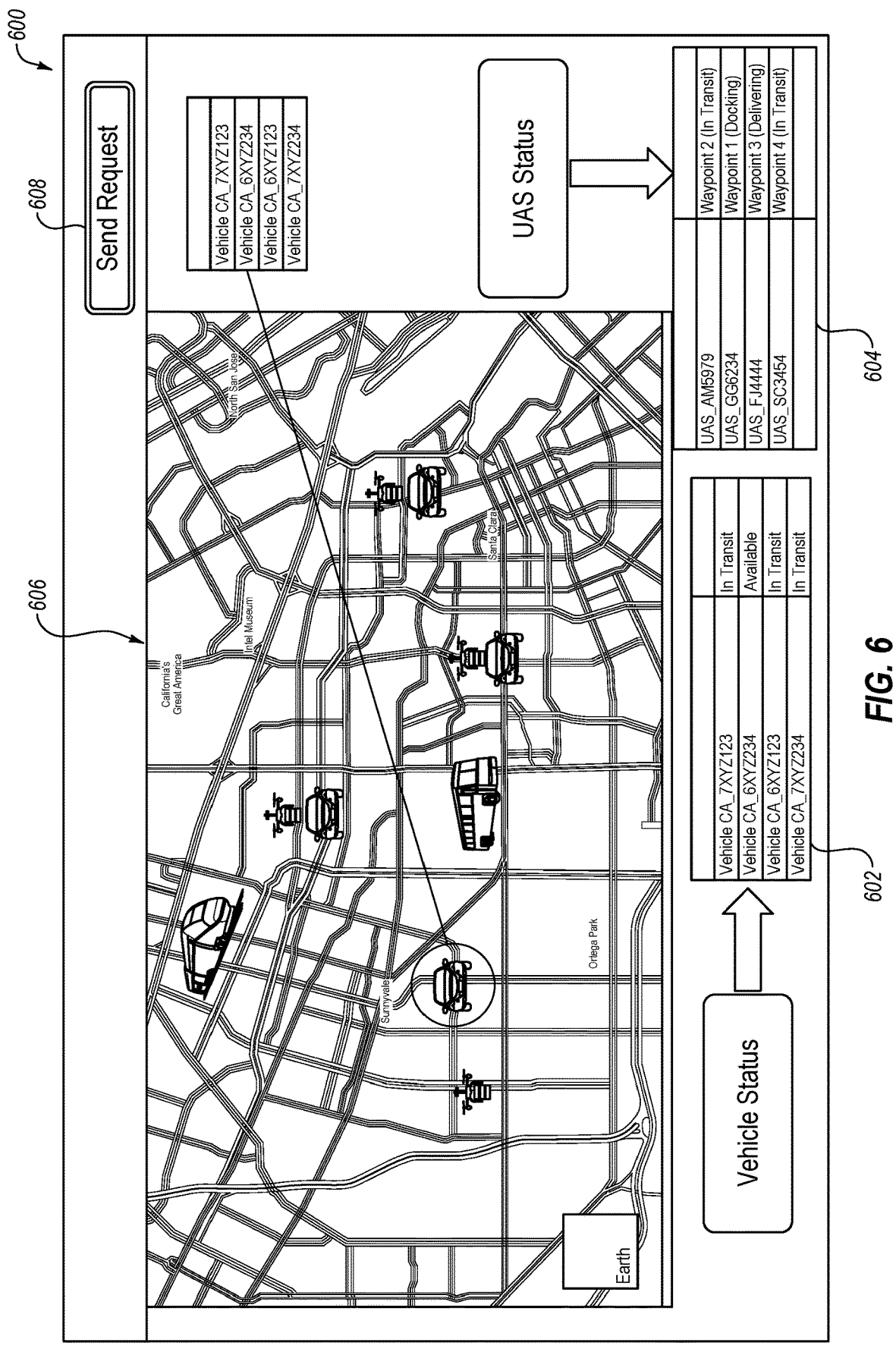
FIG. 6 illustrates an example graphical user interface (GUI) screenshot.

FIG. 6 depicts an example graphical user interface (GUI) screenshot 600 of a UA transportation system depicting location and statuses of various vehicles and UAs within a geographical area. GUI screenshot 600 may represent a display provided to, for example, a system controller (e.g., a driver of a vehicle) of a UA transportation system. GUI screenshot 600 depicts a status of each vehicle within the geographical area (as indicated by reference number 602) and a status of each UA within the geographical area (as indicated by reference number 604). Further, GUI screenshot 600 includes a map 606, which depicts a location of various UAs and vehicles within the geographical area. Further, screenshot 600 depicts a "send request" button 608, which may be used by a user (e.g., a controller, operator, etc.) to request one or more vehicles to transport a UA.

Figure 7C:
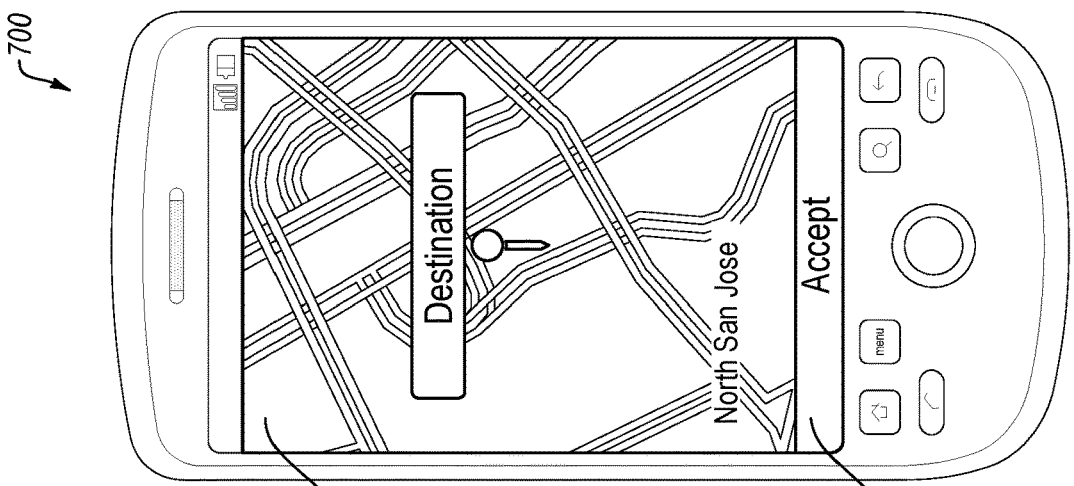
FIGS. 7A-7C illustrate other example GUI screenshots.
Figure 7B:
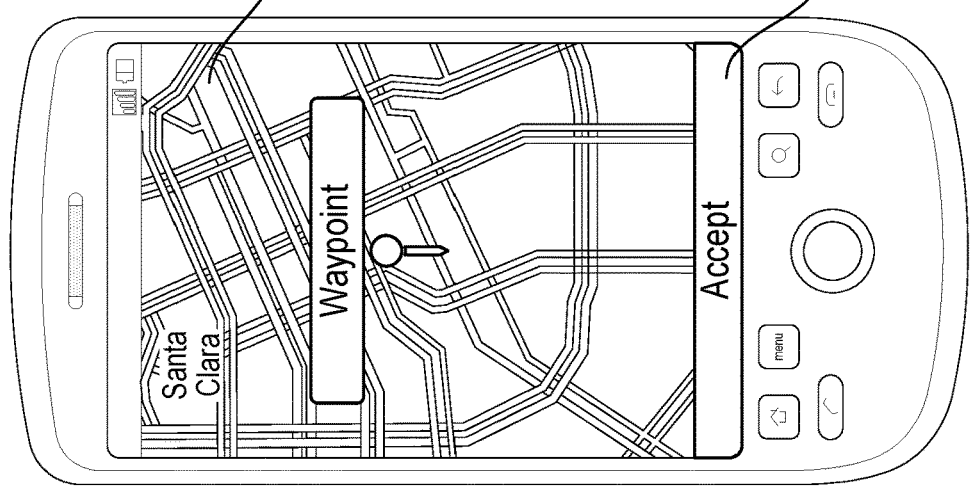
Figure 7A:
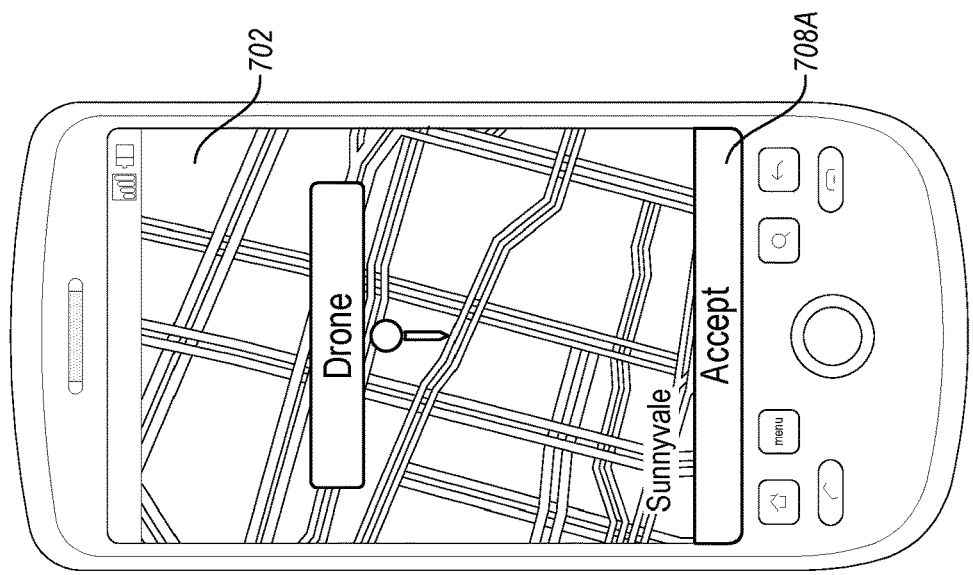

FIGS. 7A-7C depicts an example GUI screenshot 700 of a UA transportation system. GUI screenshot 700 may represent a display provided to a vehicle operator (e.g., a driver of a vehicle). GUI screenshot 700 includes a map 702 illustrating a location of a UA, a map 704 illustrating a waypoint of the UA, and a map 706 illustrating a destination of the UA. Further, GUI screenshot 700 includes "Accept" buttons 708A-708C, which enable the vehicle operator to accept a request to pick up the UA, accept a request to transport the UA to the waypoint, and/or accept a request to transport the UA to its destination.

Figure 8:
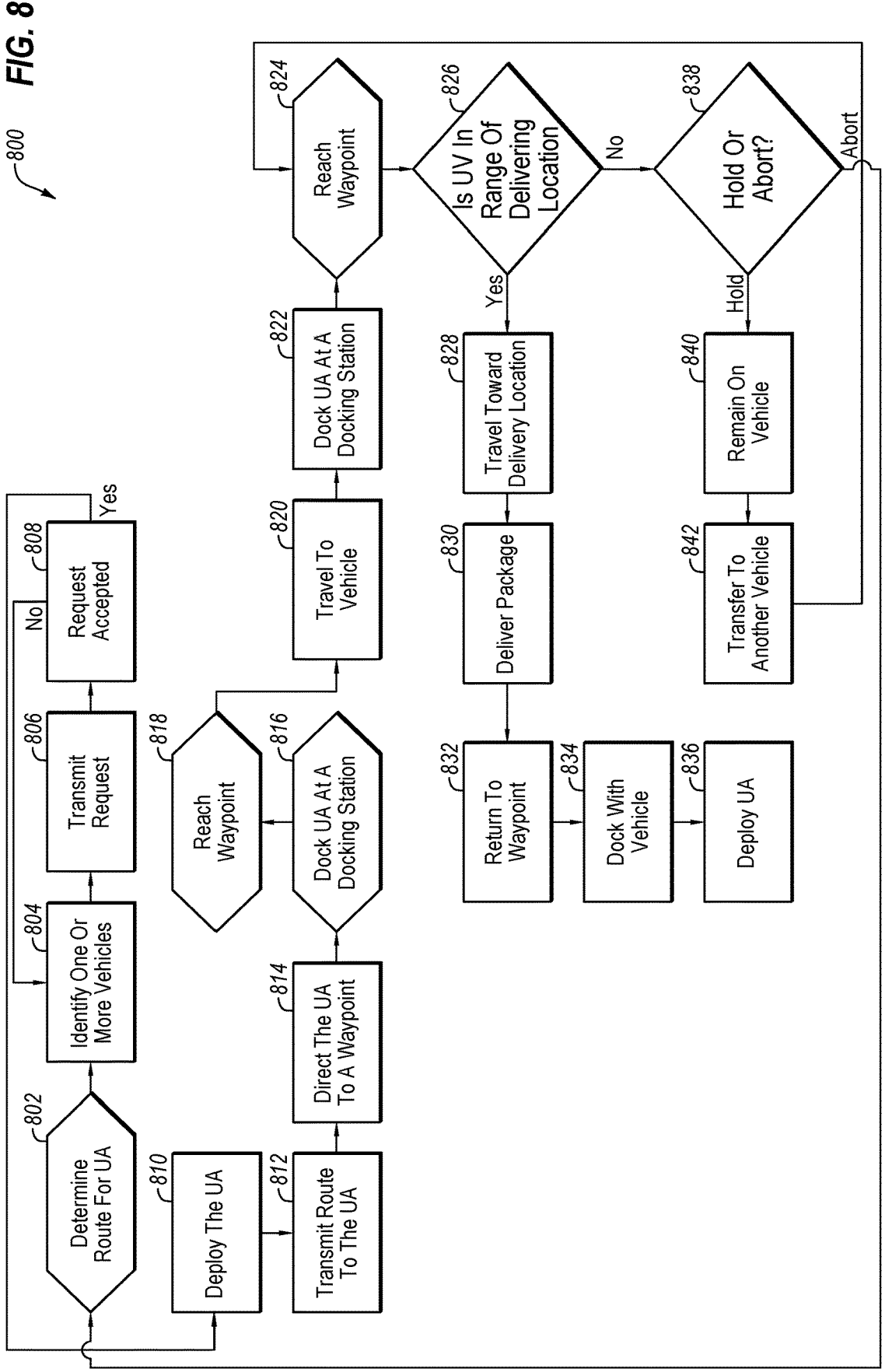
FIG. 8 depicts an example flow diagram of a method of transporting a UA.

FIG. 8 shows an example flow diagram of a method 800 of transporting a UA via one or more vehicles, arranged in accordance with at least one embodiment described herein. Method 800 is one contemplated non-limiting example of transporting a UV, and other methods are within the scope of the present disclosure. Although illustrated as discrete blocks, various blocks may be divided into additional blocks, combined into fewer blocks, or eliminated, depending on the desired implementation.

Figure 11:
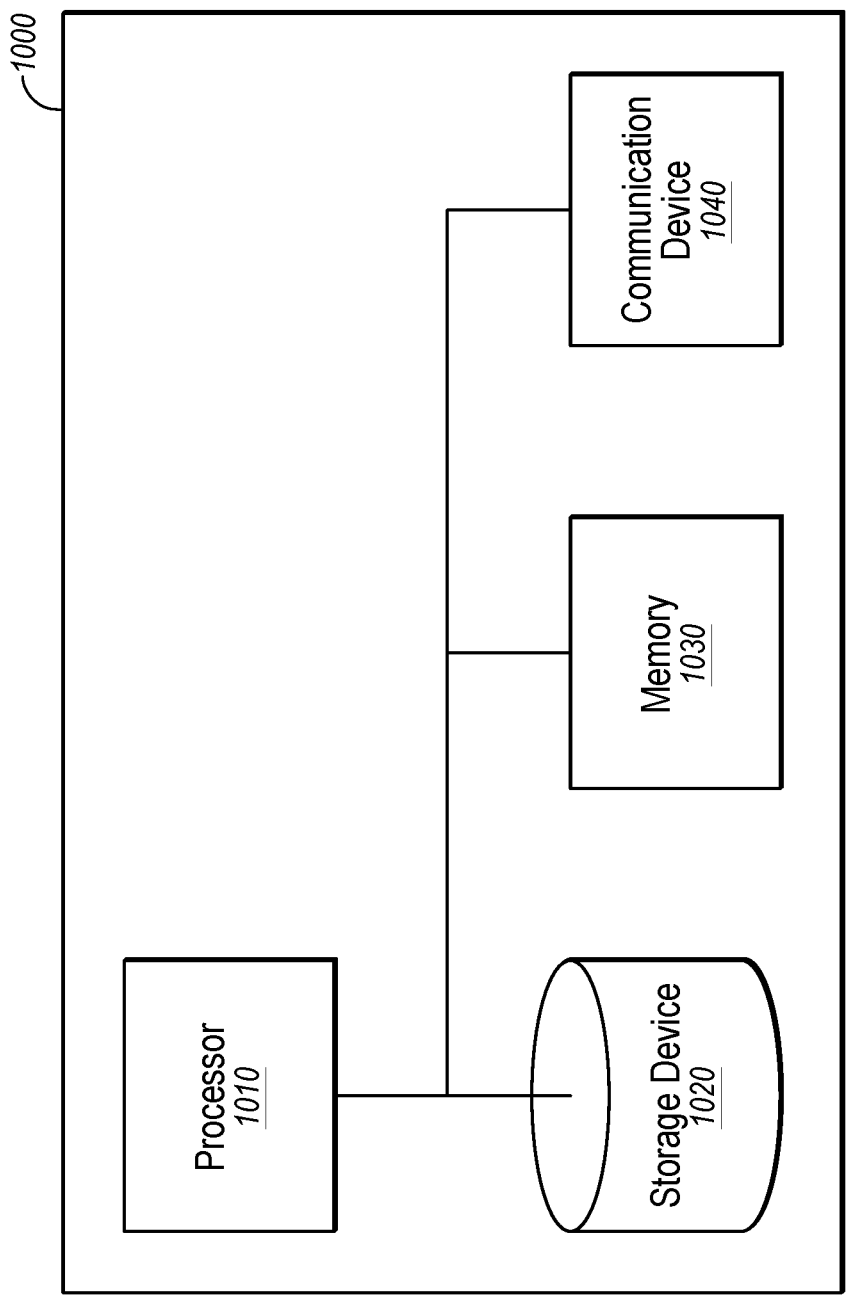
FIG. 11 is a block diagram of an example computing system.

In some embodiments, method 800 may be performed by one or more devices, such as system 450 of FIG. 5A, system 500 of FIG. 5B, and/or system 1000 of FIG. 11. For instance, processor 1010 of FIG. 11 may be configured to execute computer instructions stored on memory 1030 to perform functions and operations as represented by one or more of the blocks of method 800.

Method 800 may begin at block 802. At block 802, a route for a UA from a location of the UA to its destination may be determined, and method 800 may proceed to block 804. For example, one or more processors of control unit 452 (see FIG. 5A) and/or processor 1010 (see FIG. 11) may determine the route for the UA. In some embodiments, in response to a request from a UA to be transported to a destination (e.g., sent via UA unit 456), a location of the UA may be determined, and the route may be determined.

At block 804, one or more vehicles for transporting the UA to its destination via the determined route may be identified, and method 800 may proceed to block 806. For example, one or more processors of control unit 452 (see FIG. 5A) and/or processor 1010 (see FIG. 11) may identify the one or more vehicles as optimal vehicles for transporting the UA. More specifically, via known locations of one or more vehicle units 454 (see FIG. 5A), one or more processors of control unit 452 (see FIG. 5A) and/or processor 1010 (see FIG. 11) may identify the one or more vehicles.

At block 806, a request may be transmitted to the one or more identified vehicles, and method 800 may proceed to block 808. For example, control unit 452 (see FIG. 5A) may transmit a request to vehicle unit 454 of the one or more identified vehicles.

At block 808, a determination may be made as to whether the one or more identified vehicles accepted the request. If the request is accepted, method 800 may proceed to block 810. If the request is not accepted, method 800 may return to block 804.

In some embodiments, one or more operations of at least blocks 802-808 may be continuous until a UA accomplishes a task (e.g., delivering one or more packages at one or more destinations and returning to its original location (e.g., a warehouse). For example, after a route and/or one or vehicles have been identified for transporting a UA and after the UA delivers a first package, a route may be updated (e.g., dynamically), and/or the identified one or more vehicles may be modified. More specifically, for example, after determining a route and two vehicles two transport a UV, the UV may be in route (e.g., flying) to a first waypoint. However, in this example, it may be determined (e.g., via control unit 452; see FIG. 5A), that a single vehicle, which is traveling to a destination (e.g., in range of a delivery location), is available (e.g., identified and accepted a request) for transport. In this example, the route and the scheduled vehicle(s) may be dynamically updated.

At block 810, the UA is deployed, and method 800 may proceed to block 812. For example, after receiving the determined route, UA 100 (see FIGS. 1A and 1B) may be deployed. Although, in this example, the UA is deployed after the route is determined, the UA may be deployed prior to determining the route and/or identifying the one or more vehicles.

At block 812, the determined route may be transmitted to the UA, and method may proceed to block 814. For example, the determined route, possibly including one or more waypoints to the one or more identified vehicles, may be transmitted from control unit 452 (e.g., via control unit 452; see FIG. 5A) to UA 100 (e.g., see FIGS. 1A and 1B). Although in this example the determined route is transmitted to a deployed UA, the disclosure is not so limited. Rather, the determined route may be transmitted to the UA prior to deployment.

At block 814, the UA may be directed to a first waypoint, and method 800 may proceed to block 816. For example, the UA, which may include UA unit 456 (see FIG. 5A), may travel via flight to the first waypoint.

At block 816, the UA may dock on docking station mounted to a vehicle of the one or more identified vehicles, and method 800 may proceed to block 818. In some embodiments, the UA may establish communication with a vehicle (e.g., vehicle unit 454) prior to docking on an associated docking station. In some embodiments, the UA (e.g., UA unit 456) and the vehicle (e.g., vehicle unit 454) may communicate (e.g., via transmission and/or visual identification) to coordinate docking. For example, at the first waypoint, the UA may dock on docking station 102 (see FIGS. 1A, 1B, 2A, 2B, and/or 2C), which is coupled to the vehicle.

At block 818, a second waypoint may be reached, and method 800 may proceed to block 820. For example, UA unit 456 (see FIG. 5A) may determine that the UA has reached the second waypoint.

At block 820, the UA may travel to a second identified vehicle of the one or more identified vehicles, and method 800 may proceed to block 822. For example, UA unit 456 and/or control unit 452 may cause the UA to undock and launch from the first vehicle and move (e.g., fly) toward a second vehicle.

At block 822, the UA may dock on docking station mounted to the second vehicle, and method 800 may proceed to block 824. In some embodiments, the UA may establish communication with the second vehicle (e.g., vehicle unit 454) prior to docking on an associated docking station. For example, the UA (e.g., UA unit 456) and the vehicle (e.g., vehicle unit 454) may communicate (e.g., via transmission and/or visual identification) to coordinate docking. Further, for example, the UA may dock on docking station 102 (see FIGS. 1A, 1B, 2A, 2B, and/or 2C), which is coupled to the second vehicle.

At block 824, a final waypoint may be reached, and method 800 may proceed to block 826. For example, control unit 452 and/or UA unit 456 (see FIG. 5A) may determine that the UA has reached the final waypoint.

At block 826, a determination may be made as to whether the UA is in range of a delivery location. For example, UA unit 456 and/or control unit 452 may determine whether the UA is within a delivery range. In some embodiments, this determination may be based on one or more safety guidelines.

If it is determined that the UA is within range of the delivery location, method 800 may proceed to block 828. If it is determined that the UA is not within range of the delivery location, method 800 may proceed to block 838.

At block 828, the UA may travel to its delivery location, and method 800 may proceed to block 830. For example, UA unit 456 and/or control unit 452 may cause the UA to undock and launch from the second vehicle and move (e.g., fly) toward the delivery location.

At block 830, a package may be delivered, and method 800 may proceed to block 832. For example, the UA, which is carrying the package, may reach it destination and deliver the package.

At block 832, the UA may travel to a return waypoint, and method 800 may proceed to block 834. For example, the determined route may also include a return route including one or more return route waypoints. For example, the return waypoint may include the second waypoint or a different waypoint.

At block 834, the UA may dock on docking station mounted to a third vehicle, and method 800 may proceed to block 836. For example, the UA may dock on docking station 102 (see FIGS. 1A, 1B, 2A, 2B, and/or 2C), which is coupled to a third vehicle. For example, the third vehicle may include the first vehicle, the second vehicle, or a different vehicle.

At block 836, the UA may be deployed. For example, the UA may be deployed toward another waypoint (e.g., to return to its original location or to delivery another package) and/or another delivery location.

At block 838, a determination may be made as to whether the UA should remain docked with the second vehicle or abort the second vehicle and find another vehicle. If it determined to remain docked with the second vehicle, method 800 may proceed to block 840 where the UA may remain on the second vehicle. If it determined to abort and find another vehicle, method 800 may return to block 802.

At block 842, the UA may transfer to another vehicle that is traveling toward the delivery location, and method 800 may return to block 824.

Modifications, additions, or omissions may be made to method 800 without departing from the scope of the present disclosure. For example, the operations of method 800 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 9:
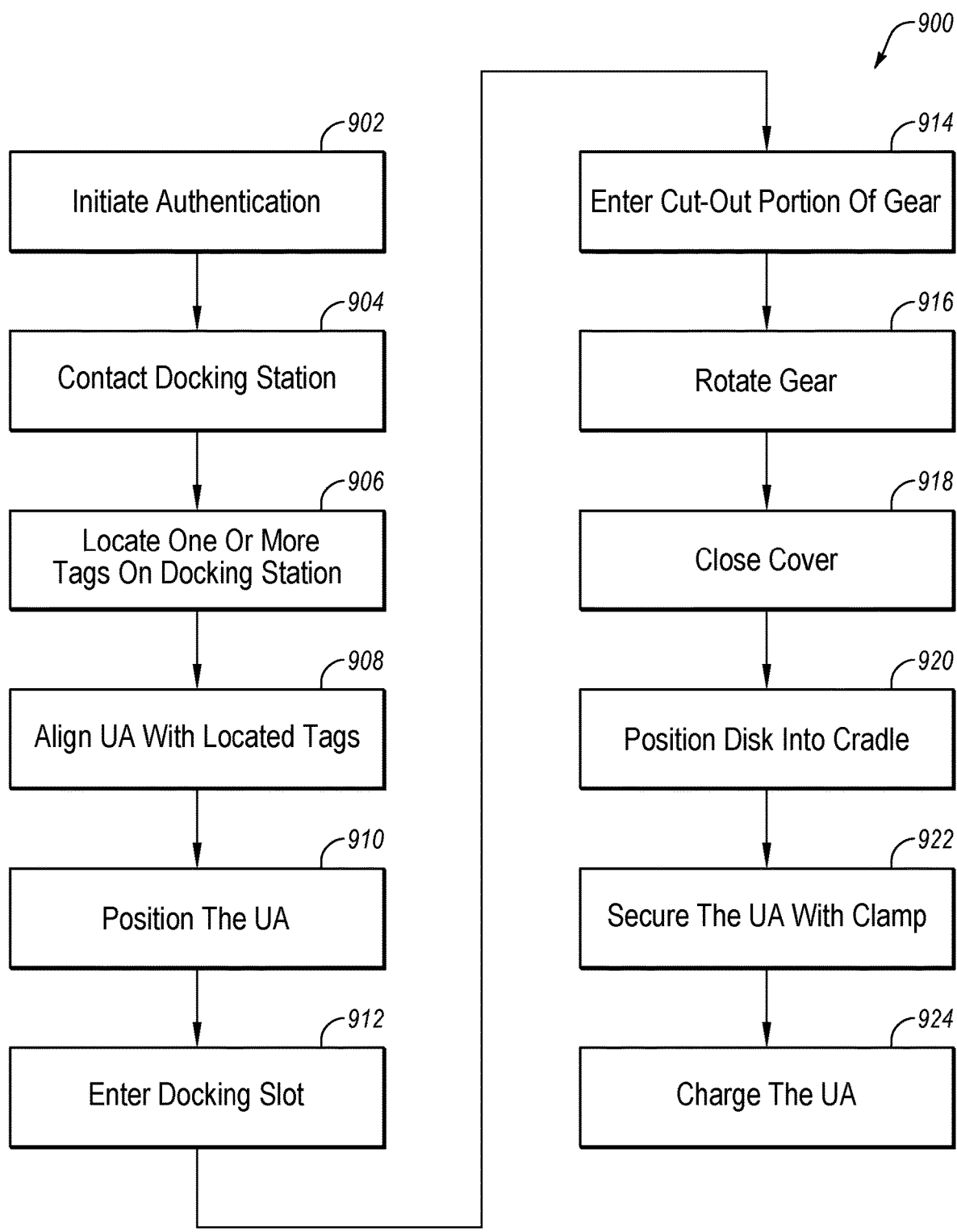
FIG. 9 depicts an example flow diagram of a method of docking a UA on a docking station.

FIG. 9 shows an example flow diagram of a method 900 of docking a UA at a docking station, arranged in accordance with at least one embodiment described herein. Although illustrated as discrete blocks, various blocks may be divided into additional blocks, combined into fewer blocks, or eliminated, depending on the desired implementation.

In some embodiments, method 900 may be performed by one or more devices, such as system 450 of FIG. 5A, system 500 of FIG. 5B, and/or system 1000 of FIG. 11. For instance, processing device 1020 of FIG. 11 may be configured to execute computer instructions stored on memory 1030 to perform functions and operations as represented by one or more of the blocks of method 900.

Method 900 may begin at block 902. At block 902, an authentication process between a UA and a docking station mounted to a vehicle may be initiated, and method 900 may proceed to block 904. More specifically, for example, with reference to FIGS. 1A, 1B and 2A-2C, an authentication process between UA 100 and docking station 202 of vehicle 114 may be initiated. The authentication process may be initiated by UA 100 (e.g., UA unit 456), control unit 452, docking station 202, and/or vehicle 114 (e.g., vehicle unit 454).

At block 904, the UA may contact a beacon on the docking station, and method 900 may proceed to block 906. For example, UA unit 456 (see FIG. 5A) may contact a beacon on docking station 202.

At block 906, one or more tags of the docking station may be located, and method 900 may proceed to block 908. For example, the UA (e.g., UA unit 456) may locate the one or more tags (e.g., cues 210A, 210B, 220A, and/or 220B; see FIGS. 2B and 2C) of docking station 202.

At block 908, the UA may be aligned with the located tags, and method 900 may proceed to block 910. For example, UA 100 may be aligned with cue 210A, cue 210B, cue 220A, and/or cue 220B.

At block 910, a disk of the UA may be positioned above a plate of the docking station, and method 900 may proceed to block 912. For example, docking disk 108 of UA 100 may be positioned above docking plate 210 of docking station 202 (see FIGS. 2A-2C).

At block 912, the UA may enter a docking slot of the docking station, and method 900 may proceed to block 914. For example, pole 106 (see FIGS. 1A and 1B) of UA 100 may enter docking slot 208 of docking station 202 (see FIGS. 2A-2C).

At block 914, the UA may enter a cut-out portion of a gear, and method 900 may proceed to block 916. For example, pole 106 of UA 100 (see FIGS. 1A and 1B) may enter cut-out portion 207 of gear 205 of docking station 202 (see FIGS. 2A-2C).

At block 916, a gear of the docking station may rotate, and method 900 may proceed to block 918. For example, gear 205 (see FIGS. 2A and 2B) may rotate, which may secure pole 106 (see FIG. 1A) of UA 100 via at least clamp 212. More specifically, for example, gear 204 may rotate, thus causing gear 205 to rotate.

At block 918, a cover of the docking station may be closed, and method 900 may proceed to block 920. For example, cover 206 (see FIGS. 2A and 2B) may be closed. In some embodiments, cover 206 may be closed in response to the rotation of gear 204. Further, in some embodiments, cover 206 and docking slot 208 (see FIGS. 2A and 2B) may be closed substantially simultaneously.

At block 920, a docking disk of may be positioned into a cradle of a docking station, and method 900 may proceed to block 922. For example, docking disk 108 of UA 100 (see FIG. 1A) may be positioned into a cradle of docking plate 210 of docking station 202.

At block 922, a clamp may secure the UA, and method 900 may proceed to block 924. For example, clamp 212 (see FIGS. 2A and 2B) may secure (e.g., clamp) pole 106 of UA 100 (see FIG. 1A).

At block 924, the UA may be charged. For example, with reference to FIGS. 1A, 2B, and 3, power may be provided from docking station 202 to UA 100 via docking disk 108 (e.g., coils 121) and electrical leads 119 of docking plate 110 of docking station 202.

Modifications, additions, or omissions may be made to method 900 without departing from the scope of the present disclosure. For example, the operations of method 900 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 10:
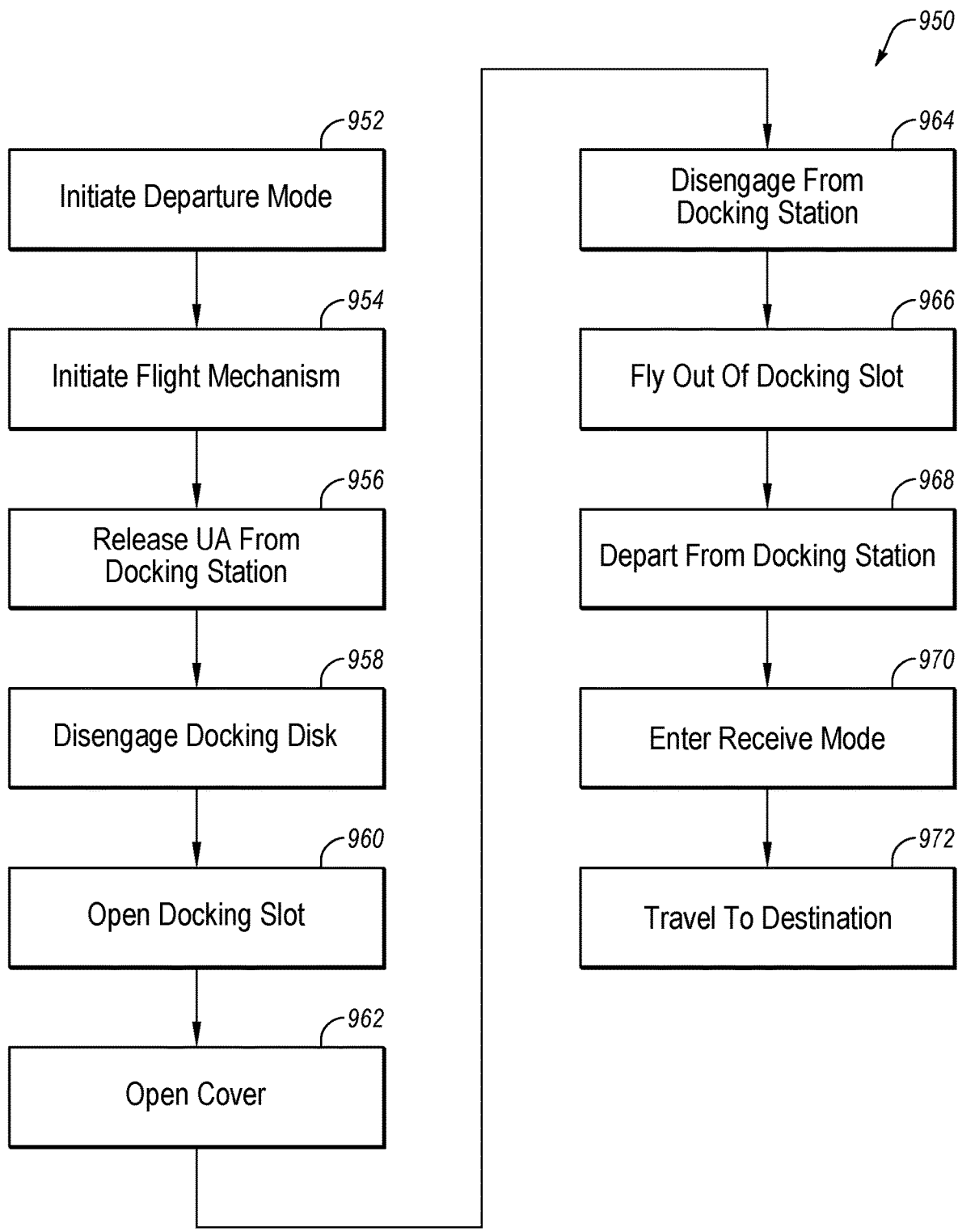
FIG. 10 depicts an example flow diagram of a method of undocking a UA from a docking station.

FIG. 10 shows an example flow diagram of a method 950 of undocking a UA from a docking station, arranged in accordance with at least one embodiment described herein. Although illustrated as discrete blocks, various blocks may be divided into additional blocks, combined into fewer blocks, or eliminated, depending on the desired implementation.

In some embodiments, method 950 may be performed by one or more devices, such as system 450 of FIG. 5A, system 500 of FIG. 5B, and/or system 1000 of FIG. 11. For instance, processing device 1020 of FIG. 11 may be configured to execute computer instructions stored on memory 1030 to perform functions and operations as represented by one or more of the blocks of method 950.

Method 950 may begin at block 952. At block 952, upon, for example, a UA reaching a destination, a departure mode may be initiated, and method 950 may proceed to block 954. More specifically, for example, with reference to FIGS. 1A, 1B, and 5A, a departure mode may be initiated by UA 100 (e.g., UA unit 456), control unit 452, docking station 102, and/or vehicle 114 (e.g., vehicle unit 454).

At block 954, a flight mechanism of the UA may be initiated, and method 500 may proceed to block 956. For example, one or more propellers of UA 100 (see FIG. 1A) may be started (e.g., via UA 100 and/or control unit 452.).

At block 956, the UA may be released from the docking station, and method 950 may proceed to block 958. For example, clamp 212 (see FIGS. 2A and 2B) of docking station 202 may release pole 106 (see FIG. 1A) of UA 100.

At block 958, the UA may at least partially disengage from the docking station, and method 950 may proceed to block 958. For example, docking disk 108 of UA 100 (see FIG. 1A) may "lift off" from a cradle of plate 210 of docking station 202 (see FIGS. 2A and 2B).

At block 960, a cut-out portion of a gear may rotate and open a docking slot of the docking station 202, and method 950 may proceed to block 962. For example, gear 205 of docking station 202 (see FIGS. 2A and 2B) may rotate causing docking slot 208 to be opened. More specifically, for example, gear 204 may rotate, thus causing rotation of gear 205.

At block 962, a cover of the docking station may be opened, and method 950 may proceed to block 964. For example, in response to rotation of gear 204, cover 206 (see FIG. 2A) may be opened. In some embodiments, cover 206 and docking slot 208 may open substantially simultaneously.

At block 964, the UA may disengage from the docking slot, and method 950 may proceed to block 956. For example, docking disk 108 of UA 100 (see FIG. 1A) may lift off out of a cradle of plate 210 of docking station 202 (see FIGS. 2A and 2B).

At block 966, the UA may fly out of the docking slot, and method 950 may proceed to block 958. For example, UA 100 (see FIG. 1A) may lift off out of docking slot 208 of docking station 102 (see FIGS. 2A and 2B).

At block 968, the UA may depart from the docking station, and method 950 may proceed to block 970. For example, UA 100 may depart vehicle 114 (see FIGS. 1A and 1B).

At block 970, the vehicle may enter a receive mode wherein the vehicle is configured to receive another UA, and method 950 may proceed to block 972. For example, vehicle 114 (e.g., vehicle unit 454 of FIG. 5A) and/or docking station 202 (e.g., FIG. 2A) may enter a receive mode.

At block 972, the UA may travel (e.g., via flight) to a destination. For example, UA 100 (see FIG. 1A) may travel via flight to its destination, which may include, for example, another vehicle, an inspection site, or a package delivery site.

Modifications, additions, or omissions may be made to method 950 without departing from the scope of the present disclosure. For example, the operations of method 950 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Various contemplated example use cases will now be described. In one example, a UA may deliver a package. More specifically, in this example, a UA (e.g., a drone) may leave a warehouse with a package and broadcasts its request to travel a particular route to its destination. The UA may choose between available vehicles and may dock with a docking station of a chosen vehicle. After docking, the UA may ride on the docking station of the chosen vehicle to a waypoint near or at the destination. Further, the UA may lift off the vehicle to and fly to its destination where the package may be delivered. After delivering the package, the UA may travel to, for example, another vehicle to, for example, make a return trip to the warehouse.

In another example, a UA may perform an inspection (e.g., on a structure and/or machinery). More specifically, in this example, a UA with inspection capabilities may perform an inspection (e.g., on a structure and/or machinery) after being delivered in accordance with one or more embodiments disclosed herein. In this example, one or more vehicles in a determined route to a site may be identified and one or more UAs may be guided to the vehicles for transportation to the site. Once located at the site, existing charging facilities on vehicles or other stationary charging mechanisms at the site may be used to charge the UA.

In another example, delivery of packages and services by a UA across water man be accomplished by utilizing one or more platforms positioned (e.g., mounted) on watercraft (e.g., private or fleet watercraft). For example, a package from a warehouse may be delivered to its destination via a boat and a UA.

As another example, existing fleets (e.g., privately owned fleets) may be used to deliver UAs to their destinations. Existing fleets may include taxi and ride sharing companies, delivery companies, public and private mail delivery trucks and any fleet with, for example, location and destination reporting capabilities and equipped with the docking station and application.

In another example, buses can be outfitted with multiple platforms for UA transportation. In this example, bus operators may be kept informed of loading and unloading of UAs and their payloads. For example, bus operators may have local override of availability of their buses for UA transportation.

As another example, trains (e.g., electric trains in urban areas that including power lines) may be used to transport one or more UAs. In this example, care may be taken to mount the docking stations where there is a clear path for docking and launching. Frequent stops made by an urban electric train may provide ample opportunity for docking and launching of UAs. Further, the predictable schedule of transit may help UA companies provide enhanced on time service.

In another example, UAs with surveillance and other security/counterterrorism sensors may be delivered by, for example, public infrastructure and/or safety vehicles to an area of operation in accordance with one or more embodiments disclosed herein. In some examples, a UA may be operational for security purposes while in transit. For example, a UA may gather data while coupled to a docking station and on the way to its destination.

In yet another example, UAs may be delivered to an area of operation during and after a disaster by one or more operable transportation systems (e.g., multiple systems, such as boats, ride share vehicles, delivery trucks, buses, etc.).

FIG. 11 is a block diagram of an example computing system 1000, in accordance with at least one embodiment of the present disclosure. For example, system 450 (see FIG. 5A), system 500 (see FIG. 5B) or one or more components thereof, may be implemented as computing system 1000. Computing system 1000 may include a desktop computer, a laptop computer, a server computer, a tablet computer, a mobile phone, a smartphone, a personal digital assistant (PDA), an e-reader device, a network switch, a network router, a network hub, other networking devices, or other suitable computing system.

Computing system 1000 may include a processor 1010, a storage device 1020, a memory 1030, and a communication device 1040. Processor 1010, storage device 1020, memory 1030, and/or communication device 1040 may all be communicatively coupled such that each of the components may communicate with the other components. Computing system 1000 may perform any of the operations described in the present disclosure.

In general, processor 1010 may include any suitable special-purpose or general-purpose computer, computing entity, or processing device including various computer hardware or software modules and may be configured to execute instructions stored on any applicable computer-readable storage media. For example, processor 1010 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 11, processor 1010 may include any number of processors configured to perform, individually or collectively, any number of operations described in the present disclosure.

In some embodiments, processor 1010 may interpret and/or execute program instructions and/or process data stored in storage device 1020, memory 1030, or storage device 1020 and memory 1030. In some embodiments, processor 1010 may fetch program instructions from storage device 1020 and load the program instructions in memory 1030. After the program instructions are loaded into memory 1030, processor 1010 may execute the program instructions.

For example, in some embodiments one or more of the processing operations of a device and/or system (e.g., an application program, a server, etc.) may be included in data storage 1020 as program instructions. Processor 1010 may fetch the program instructions of one or more of the processing operations and may load the program instructions of the processing operations in memory 1030. After the program instructions of the processing operations are loaded into memory 1030, processor 1010 may execute the program instructions such that computing system 1000 may implement the operations associated with the processing operations as directed by the program instructions.

Storage device 1020 and memory 1030 may include computer-readable storage media for carrying or having computer-executable instructions or data structures stored thereon. Such computer-readable storage media may include any available media that may be accessed by a general-purpose or special-purpose computer, such as processor 1010. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 1010 to perform a certain operation or group of operations.

In some embodiments, storage device 1020 and/or memory 1030 may store data associated with UA transportation system. For example, storage device 1020 and/or memory 1030 may store UA status information, vehicle status information, vehicle operator (e.g., driver) information, UA task information, etc.

Communication device 1040 may include any device, system, component, or collection of components configured to allow or facilitate communication between computing system 1000 and another electronic device. For example, communication device 1040 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. Communication device 1040 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 11 without departing from the scope of the present disclosure. For example, computing system 1000 may include more or fewer elements than those illustrated and described in the present disclosure. For example, computing system 1000 may include an integrated display device such as a screen of a tablet or mobile phone or may include an external monitor, a projector, a television, or other suitable display device that may be separate from and communicatively coupled to computing system 1000.

As used herein, the terms "module" or "component" may refer to specific hardware implementations configured to perform the operations of the module or component and/or software objects or software routines that may be stored on and/or executed by, for example, system 450, system 500, and/or computing system 1000. In some embodiments, the different components and modules described herein may be implemented as objects or processes that execute on a computing system (e.g., as separate threads). While some of the system and methods described herein are generally described as being implemented in software (stored on and/or executed by system 1000), specific hardware implementations or a combination of software and specific hardware implementations are also possible and contemplated. In this description, a "computing entity" may include any computing system as defined herein, or any module or combination of modules running on a computing system, such as system 1000.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of transporting an unmanned vehicle, the method comprising:
    determining, via at least one processor, a route for transporting an unmanned aircraft (UA);
    determining, via the at least one processor, at least one vehicle for transporting the UA along the determined route;
    deploying the UA to a first waypoint of the determined route;
    docking the UA with a first docking station mounted to a first vehicle of the at least one vehicle proximate the first waypoint while the first vehicle is in motion, wherein docking the UA with the first docking station while the first vehicle is in motion comprises:
        hanging the UA from the first docking station as the UA carries a payload below a body of the UA while the first vehicle is in motion, the hanging including:
            positioning a pole, extending from a top portion of the body of the UA, in a docking slot of the first docking station; and
            securing the pole in the docking slot to couple the UA to the first docking station such that the UA hangs from the first docking station by the pole;
    transporting the UA to a second waypoint of the determined route via the first vehicle; and
    undocking the UA from the first docking station at the second waypoint.

2. The method of claim 1, further comprising docking the UA to a second docking station mounted to a second vehicle of the at least one vehicle after undocking the UA from the first docking station.

3. The method of claim 2, further comprising undocking the UA from the second docking station at a third waypoint of the determined route.

4. The method of claim 1, wherein docking the UA to the first docking station comprises:
    authenticating, via the at least one processor, the UA and the first docking station;

aligning the UA with the first docking station via one or more visual cues on the first docking station;
positioning a docking disk of the UA adjacent a docking plate of the first docking station; and
supplying power from the first docking station to the UA via the docking disk.

5. The method of claim 1, wherein undocking the UA from the first docking station comprises:
opening a clamp to allow vertical movement of the UA; after opening the clamp:
initiating a flight mode of at least one of the UA and the first docking station;
initiating liftoff of the UA from the first docking station;
disengaging a docking disk of the UA from a docking plate of the first docking station;
opening the docking slot of the first docking station to release the pole of the UA from the first docking station to allow horizontal movement of the UA; and
after opening the docking slot, allowing the UA to depart from the first docking station.

6. The method of claim 1, further comprising delivering at least one package with the UA to a destination after undocking the UA from the first docking station at the second waypoint.

7. The method of claim 1, further comprising deploying the UA to a destination to perform at least one task after undocking the UA from the first docking station at the second waypoint.

8. A non-transitory computer-readable medium that includes instructions that, when executed by one or more processors, are configured to cause the one or more processors to perform operations, the operations comprising:
determining a route for transporting an unmanned aircraft (UA);
determining a first vehicle for transporting the UA along the determined route;
deploying the UA to a first waypoint of the determined route;
docking the UA with a first docking station mounted to the first vehicle proximate the first waypoint while the first vehicle is in motion, wherein docking the UA with the first docking station while the first vehicle is in motion comprises:
hanging the UA from the first docking station as the UA carries a payload below a body of the UA while the first vehicle is in motion, the hanging including:
positioning a pole, extending from a top portion of the body of the UA, in a docking slot of the first docking station; and
securing the pole in the docking slot to couple the UA to the first docking station such that the UA hangs from the first docking station by the pole; and
undocking the UA from the first docking station after arriving at a second waypoint of the determined route.

9. The non-transitory computer-readable medium of claim 8, the operations further comprising docking the UA to a second docking station mounted to a second vehicle after undocking the UA from the first docking station.

10. The non-transitory computer-readable medium of claim 9, the operations further comprising undocking the UA from the second docking station at a third waypoint of the determined route.

11. The non-transitory computer-readable medium of claim 8, wherein docking the UA to the first docking station comprises:

authenticating the UA and the first docking station;
aligning the UA with the first docking station via one or more visual cues on the first docking station;
positioning a docking disk of the UA adjacent a docking plate of the first docking station; and
supplying power from the first docking station to the UA via the docking disk.

12. The non-transitory computer-readable medium of claim 8, wherein undocking the UA from the first docking station comprises:
opening a clamp to allow vertical movement of the UA; after opening the clamp:
initiating a flight mode of at least one of the UA and the first docking station;
initiating liftoff of the UA from the first docking station;
disengaging a docking disk of the UA from a docking plate of the first docking station;
opening the docking slot of the first docking station to release the pole of the UA from the first docking station to allow horizontal movement of the UA; and
after opening the docking slot, allowing the UA to depart from the first docking station.

13. The non-transitory computer-readable medium of claim 8, the operations further comprising delivering at least one package with the UA to a destination after undocking the UA from the first docking station at the second waypoint.

14. The non-transitory computer-readable medium of claim 8, the operations further comprising deploying the UA to a destination to perform at least one task after undocking the UA from the first docking station at the second waypoint.

15. An unmanned vehicle transportation system, comprising:
at least one controller configured to:
determine a route for transporting an unmanned aircraft (UA);
determine at least one vehicle for transporting the UA along the determined route;
deploy the UA to a first waypoint of the determined route;
dock the UA with a first docking station mounted to a first vehicle of the at least one vehicle proximate the first waypoint while the first vehicle is in motion, wherein docking the UA with the first docking station while the first vehicle is in motion comprises:
hanging the UA from the first docking station as the UA carries a payload below a body of the UA while the first vehicle is in motion, the hanging including:
positioning a pole, extending from a top portion of the body of the UA, in a docking slot of the first docking station; and
securing the pole in the docking slot to couple the UA to the first docking station such that the UA hangs from the first docking station by the pole; and
undock the UA from the first docking station after arriving at a second waypoint of the determined route.

16. The unmanned vehicle transportation system of claim 15, wherein the at least one controller is further configured to dock the UA to a second docking station mounted to a second vehicle of the at least one vehicle after undocking the UA from the first docking station.

17. The unmanned vehicle transportation system of claim 16, wherein the at least one controller is further configured to undock the UA from the second docking station at a third waypoint of the determined route.

18. The unmanned vehicle transportation system of claim 15, wherein the at least one controller is further configured to:
   authenticate the UA and the first docking station;
   align the UA with the first docking station via one or more visual cues on the first docking station; and
   position a docking disk of the UA adjacent a docking plate of the first docking station to dock the UA to the first docking station.

19. The unmanned vehicle transportation system of claim 15, wherein the at least one controller is further configured to:
   open a clamp to allow vertical movement of the UA;
   after opening the clamp:
      initiate a flight mode of at least one of the UA and the first docking station;
      initiate liftoff of the UA from the first docking station;
      disengage a docking disk of the UA from a docking plate of the first docking station;
      open the docking slot of the first docking station to release the pole of the UA from the first docking station to allow horizontal movement of the UA; and
      after opening the docking slot, allow the UA to depart from the first docking station.

20. The unmanned vehicle transportation system of claim 15, wherein the at least one controller is further configured to deploy the UA to a destination to perform at least one task after the UA is undocked from the first docking station.

* * * * *